Figure 1:
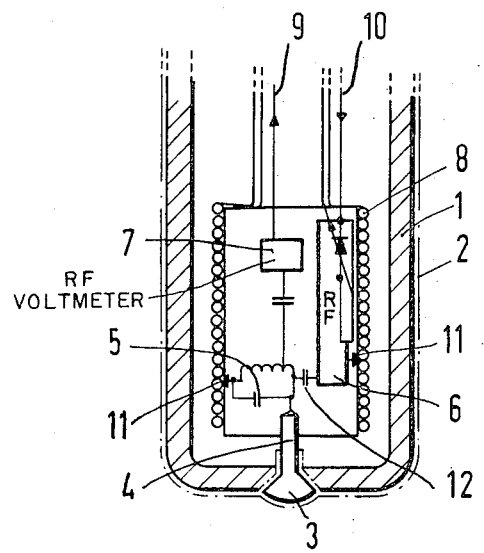

United States Patent [19]
Deichelmann et al.

[11] 3,826,980

[45] July 30, 1974

[54] ENAMELED ELECTRICAL SENSING PROBE

[75] Inventors: Hermann Deichelmann; Herrmann Veit, both of Schwetzingen, Germany

[73] Assignee: Pfaudler-Werke AG, Schwetzingen, Germany

[22] Filed: Dec. 4, 1969

[21] Appl. No.: 882,292

Related U.S. Application Data

[63] Continuation of Ser. No. 693,928, Dec. 27, 1967, abandoned.

[52] U.S. Cl.............................. 324/61 P, 317/246
[51] Int. Cl............................................ G01r 27/26
[58] Field of Search ...... 324/61; 73/304 C; 317/246

[56] References Cited
UNITED STATES PATENTS
2,204,196  6/1940  Straatman.............................. 324/1
3,254,333  5/1966  Baumoel.......................... 73/304 X FOREIGN PATENTS OR APPLICATIONS
695,568  8/1953  Great Britain........................ 324/61

*Primary Examiner*—Stanley T. Krawczewicz
*Attorney, Agent, or Firm*—Theodore B. Roessel

[57] ABSTRACT

A transducer assembly, to measure dielectric and similar electrical properties of materials is constructed in the form of a tubular electrode of enameled steel, closed off at the bottom with a second, button electrode set into the bottom closure, insulated from the tubular electrode by the enamel, and further covered by a unitary enamel layer to resist high temperature, corrosion and the like; and electronic measuring components including an RF generator circuit, tuned circuits and the like coupled to the electrodes and located within the tubular electrode.

6 Claims, 4 Drawing Figures

PATENTED JUL 30 1974　　　　　　　　　　　　3,826,980

HERMANN DEICHELMANN &
HERMANN VEIT,
    Inventors by Stephen H. Frishauf
    Atty

ENAMELED ELECTRICAL SENSING PROBE

CROSS-REFERENCE TO RELATED APPLICATION

This is a continuation of application Ser. No. 693,928, filed Dec. 27, 1967, now abandoned. A certified copy of German Pat. application Ser. No. 43 289, filed Oct. 30, 1967, the priority of which is claimed, is in the file of the parent application.

The present invention relates to a transducer unit, and more particularly to a transducer unit for use in chemical process control to determine sensed electrical properties of materials, which unit is immersible directly in reaction vessels.

Chemical and physical-chemical technical processes are often controlled by measuring the electrical conductivity and dielectric constants of the material being produced. Such measurement is preferably carried out within a reaction vessel by means of a transducer unit having a metallic electrode, covered with a non-conductive dielectric layer and coupled capacitatively to the material being produced. A high-frequency generator, tuning and tank circuits for the generator, tuning elements and an RF potential measuring element in an electrical circuit with an electrode to obtain indications of electrical characteristics of the material being produced.

Transducer elements as described function satisfactorily in laboratories; when used in production processes, however, it was difficult to utilize such transducers since the known glass or metallic electrodes were subject to damage upon uninterrupted application of high temperature, high pressure, or other ambient conditions, causing damage to the surfaces of the transducer elements and thus failure of the units.

It is an object of the present invention to provide an electronic transducer element capable of withstanding at least 230°C, pressures of at least 50 atmospheres, and sealed against highly corrosive chemicals, and usable in chemical production apparatus.

SUBJECT MATTER OF THE PRESENT INVENTION

Briefly, in accordance with the present invention, a tubular electrode made of outside enamel steel has a bottom closure, with an opening therein, likewise enameled; a steel electrode is set into the bottom closure, the entire assembly being enameled over the outside to form a smooth unbroken covering. The electronic measuring components themselves are located within the tubular electrode and coupled to both the bottom electrode and the tubular electrode; these electronic measuring components include an RF generator circuit, tank circuits coupled to the electrodes, and a measuring circuit responsive to changes in coupling between the electrodes, which change is dependent on the materials surrounding the transducer unit.

Both electrodes are thus efficiently protected against corrosion. If cooling is necessary for the electronic parts, cooling coils can readily be introduced into the tubular electrode to prevent excessive temperatures. Remote tuning of the generator can be obtained by including components in the generator tank circuit which vary the frequency, such as diodes changing their capacity upon change in bias, and remotely controllable either by direct current or low-frequency alternating current.

The enamel covering the steel housing of the outer tubular electrode is preferably highly corrosion resistant special enamel, melted on the button electrode in such a manner that the two electrodes are insulated from each other and yet a single, fused enamel layer covers the entire assembly. Such a transducer element can form an insert unitary with an enameled pressure reaction vessel. It can also be inserted in tubes for thermometers, flow interrupters to introduce turbulence into lamina flow, valve cones, valve spindles and other elements already present and providing openings into a closed reaction system.

Figure 2:
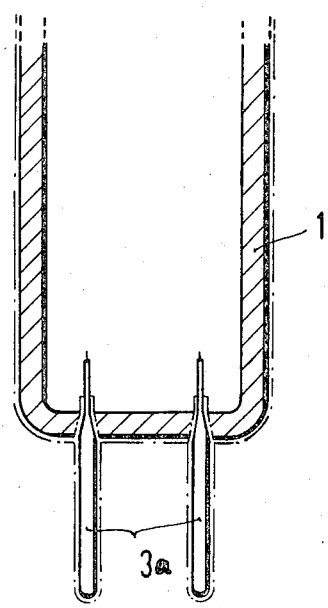
Figure 3:
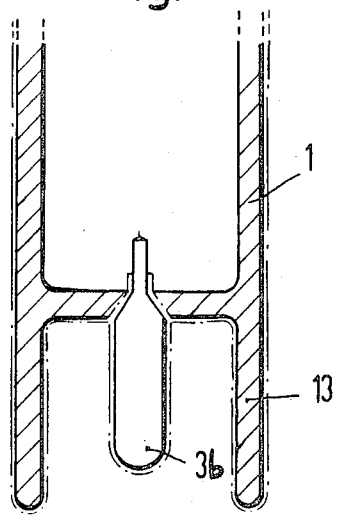
Figure 4:
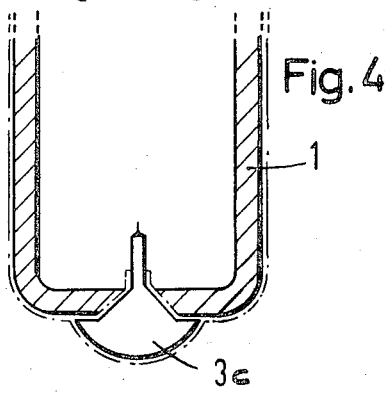

The structure, organization, and operation of the invention will now be described more specifically with reference to the accompanying drawings, wherein:

FIG. 1 is a longitudinal cross-sectional view of the transducer element simultaneously serving as a flow interrupter for installation in an enameled agitation type reaction vessel; and FIGS. 2 – 4 are longitudinal cross-sectional views of alternate embodiments of the outside electrode, and the inner, button electrode in accordance with the present invention.

The electronic components of the transducer elements are illustrated in schematic form, in FIG. 1, since the components themselves are well-known in the art. They are all wholly contained within the outer tubular electrode, which can be set into a reaction vessel to form an interrupter to interrupt lamina flow, for example along the walls of the vessel. The outer housing 1, of steel, is covered with an enamel layer 2, the enamel being highly resistant against chemical attack. Electrode 3, set into the closed bottom of electrode 1, likewise consists of steel. It is, as seen in FIG. 1, approximately conical, with a slightly bowed outside bottom directed towards the interior of the reaction vessel in which the transducer unit is to be used. Forming the electrode in this manner provides for high mechanical stability. The outside of the transducer unit is preferably made by first pre-enameling the tubular steel housing 1, as well as the outer surfaces of electrode 3. Electrode 3, pre-enameled, is then inserted in an opening formed in the steel housing 1 and matching the outer surface of electrode 3. In order to properly locate the electrode 3, three spacer elements, for example of ceramic, are placed between the surface of the conical electrode 3 and the opening in steel housing 1, in order to provide for triangular support. The assembly is then heated and the enameled layers are fused together to form an unbroken unitary covering.

The end portion 4 of button electrode 3, extending into the interior of the steel housing 1, is not enameled and provides for electrical connection to a tank circuit 5. Besides tank circuit 5, an RF generator 6 and an RF measuring network is provided in known manner. Preferably, a cooling coil 8 is inserted within steel housing 1 to prevent excessive and dangerous heating of the electrical components, particularly when the transducer is used in high-temperature reaction vessel. The RF generator, in accordance with known practice, includes internally a resonance, or tank circuit (not shown). Diodes of variable capacity, known by themselves, are connected to the tank circuit of the RF generator — again as well known—to be modulated by a low-frequency alternating potential, or by direct potential over a control line 10. A d-c measuring line 9 connects to the RF potential meter 7, for remote metering. Power connections to the various circuits can be provided in well-known manner and are not shown in the drawings for simplicity.

Depending upon the type of production medium with which the transducer is to be used, different applications are possible. In one mode of operation, RF generator 6 supplies to tank circuit 5 an accurately calibrated high-frequency current over a coupling condenser 12. This high-frequency current causes a potential drop of the material within the vessel, into which the transducer is inserted, depending upon the characteristics of this material. After rectification, the potential drop can readily be measured.

In a different mode of operation, the measuring circuit itself is part of the high-frequency generator and determines its frequency of oscillation, which is precalibrated. Change of the frequency of oscillation, as determined by the medium in the reaction vessel, then provides a measure of the medium therein. Both methods of measuring the characteristics of materials within the reaction vessel, by themselves, are known. Remote controlled switches, for example diode matrix networks, can determine the mode of operation of the networks within the transducer unit.

The housing of transducer unit of FIG. 2 is provided with two projecting electrodes, set into a pair of openings within the steel housing 1 and bonded thereto by enamel so that both the steel housing and both electrodes are covered by single, unitary coating of enamel. The electrodes, themselves, are shown at 3a. Since the electrodes, themselves, project within the medium to be measured, a comparatively large volume will react with the electrical values being applied to the electrodes.

FIG. 3 illustrates a transducer unit in which the steel housing 1 is provided with a projection 13, which protects a cylindrical electrode 3b, having a rather large surface. This arrangement also provides for large areas from which electric radiation in the interior vessel can be obtained.

FIG. 4 illustrates an electrode 3c, the tubular housing being similar to the one described in detail in connection with FIG. 1. Good mechanical stability and a large surface facing the medium being processed is obtained by the arrangement of FIG. 4, resulting in good sensitivity of the transducer assembly.

The transducer unit in accordance with the present invention can be combined in a single assembly with thermometer tubes, valve cones, valve spindles or the like, or can be inserted at any convenient point in a reaction vessel, where standard openings are provided for measuring and sensing elements.

We claim:
1. A probe adapted for immersion in a material for sensing the electrical properties of said material comprising, in combination,
   at least two metallic electrode elements,
   said electrode elements being electrically insulated from each other by a layer of enamel interposed therebetween and fused thereto,
   the exposed surface of said electrode elements and the exposed portion of said enamelled layer being covered by a continuous unbroken layer of enamel,
   whereby said unit presents a continuous seamless corrosion resistant enamel surface to the surrounding material.

2. A probe adapted to sense the electrical properties of surrounding material comprising a first metallic body,
   a second metallic body separated from said first body,
   an enamel insulator interposed between said bodies,
   an enamel layer covering the exposed surface of both of said bodies and the exposed portion of said insulator layer.

3. An electrode unit as claimed in claim 1 wherein said first electrode is tubular in shape, and said second electrode is set into one end of said tubular electrode.

4. A measuring and sensing unit assembly comprising a hollow tubular electrode,
   a second electrode set in one end of said tubular electrode,
   a first layer of enamel interposed between said electrodes and fused thereto,
   a second layer of enamel fused to the exposed surfaces of said electrodes and to the exposed portion of said first layer of enamel,
   and electrical measuring components located within said tubular electrode, said electrical measuring components being electrically coupled to both the tubular electrode and the second electrode, whereby said electrical components measure the characteristics of material in contact with the exterior of said measuring and sensing unit assembly.

5. A measuring and sensing unit as claimed in claim 4 wherein said electrical measuring components comprise a RF generator circuit coupled to said electrodes,
   a tank circuit coupled to said electrodes, and
   a measuring circuit responsive to changes in coupling between said electrodes depending upon the material surrounding said unit.

6. A measuring and sensing unit as claimed in claim 4 including a cooling coil located within said tubular electrode and surrounding said electronic measuring component.

* * * * *